US006572743B2

(12) United States Patent
Miller et al.

(10) Patent No.: US 6,572,743 B2
(45) Date of Patent: Jun. 3, 2003

(54) ELECTROPLATING ASSEMBLY FOR METAL PLATED OPTICAL FIBERS

(75) Inventors: Michael N. Miller, Austin, TX (US); Steven Y. Yu, Austin, TX (US); David J. Lentz, Leander, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/935,456

(22) Filed: Aug. 23, 2001

(65) Prior Publication Data

US 2003/0039458 A1 Feb. 27, 2003

(51) Int. Cl.⁷ .............................................. C25D 17/08
(52) U.S. Cl. .................. 204/297.06; 204/232; 204/242; 204/297.01; 204/297.1; 204/297.14
(58) Field of Search ................................. 385/123–128; 204/193, 194, 232, 242, 280, 284, 286.1, 297.01, 297.06, 297.1, 297.14, 297.09; 205/122, 135, 136; 65/430, 529

(56) References Cited

U.S. PATENT DOCUMENTS

| | | | | |
|---|---|---|---|---|
| 3,972,785 A | * | 8/1976 | Palisin, Jr. ................ 204/297.1 |
| 4,033,668 A | | 7/1977 | Presby ...................... 350/96 C |
| 4,119,363 A | | 10/1978 | Camlibel et al. .......... 350/96.2 |
| 4,139,447 A | * | 2/1979 | Faron et al. ................ 204/239 |
| 4,224,131 A | * | 9/1980 | Acero et al. ................ 204/274 |
| 4,595,480 A | * | 6/1986 | Takiar et al. ............. 204/297.1 |
| 4,759,837 A | | 7/1988 | Lefebvre et al. | |
| 5,100,507 A | | 3/1992 | Cholewa et al. ............. 156/651 |
| 5,692,086 A | | 11/1997 | Beranek et al. ................ 385/94 |
| 5,774,615 A | * | 6/1998 | Uda et al. .................... 385/128 |
| 6,139,705 A | * | 10/2000 | Brown et al. ................ 204/284 |
| 6,164,837 A | | 12/2000 | Haake et al. .................. 385/90 |
| 6,187,378 B1 | | 2/2001 | Doncsecz ................ 427/163.2 |

OTHER PUBLICATIONS

Japanese Abstract–Publication No. 06305783.
Japanese Abstract–Publication No. 57156340.

* cited by examiner

*Primary Examiner*—Nam Nguyen
*Assistant Examiner*—Brian L Mutschler
(74) *Attorney, Agent, or Firm*—Alan Ball (57) ABSTRACT

An electrode assembly for electroplating conducting portions of nonconductors comprises an insulating frame having a first projection opposite a second projection. Preferably the insulating frame comprises a resin selected from the group consisting of acrylic resins, polyvinyl chloride resins and polycarbonate resins. A metal filament, for connection to the negative pole of a source of electrical energy, extends from the first projection to the second projection. Adjacent to the metal filament a first conductive plate is attached to the insulating frame at a first distance from the metal filament. A second conductive plate attaches to the insulating frame at a second distance from the metal filament. The first plate and the second plate are adapted for connection to the positive pole of a source of electrical energy. The nonconductor is at least one optical fiber having a conducting portion in contact with the metal filament to provide connection of the conducting portion to a negative pole of the source of electrical energy. In one embodiment of an assembly according to the present invention, there is a plurality of optical fibers each having a conducting portion in contact with the metal filament. An electrode assembly may be used in a process according to the present invention to provide a conductive composite coating on the surface of a nonconductor, preferably an optical fiber.

12 Claims, 2 Drawing Sheets

ELECTROPLATING ASSEMBLY FOR METAL PLATED OPTICAL FIBERS

FIELD OF THE INVENTION

The invention relates to the preparation of terminal portions of optical fibers to be bonded, typically by soldering, into ferrules, connectors, laser diodes and related modules and devices. More particularly the present invention relates to the application of adherent metallic coatings to the ends of optical fibers to facilitate bonding of fiber ends at interfaces between the fiber ends and optoelectronic and related devices and modules including laser diodes. Adherent metallic coatings according to the present invention provide improved soldered joints having increased durability during repeated solder reflow to establish and maintain optimum alignment between light carrying optical fibers and optoelectronic packages and related devices to which they connect.

BACKGROUND OF THE INVENTION

The use of optical fiber communication networks has grown to provide an alternative to coaxial cable systems. Optical fiber communication networks include optoelectronic modules for transmitting and receiving signals. In a typical arrangement, optical fibers direct optical signals to and from a suitably packaged optoelectronic device. A common structure includes an optical fiber solder sealed inside a nose tube that is brazed to the sidewall of the package. This type of hybrid electrical-optical package arrangement is commonly referred to as a "fiber-pigtailed" hybrid package. The process for interfacing the fiber to the package is called "pigtailing."

An efficient optical fiber communications network requires proper alignment between an optical fiber and an optical subassembly. In an optoelectronic receiver, a fiber is aligned with an optical detector, typically a PIN photodiode. Light signal generation requires an optoelectronic transmitter using a light emitting diode (LED) or laser diode aligned with a suitable waveguide, such as an optical fiber. An optical fiber, correctly aligned, minimizes the amount of light attenuation within a subassembly.

The manufacture of an optoelectronic hybrid package requires precise alignment of a fiber optic member with an LED, a laser diode, or a photodetector. Alignment may thereafter be maintained using means to lock optical fibers inside optoelectronic packages. A variety of materials have been used to bond optical fibers to selected substrates including metal alloy solders. During their lifetime microelectronic solder joints show three key failure modes of overload failure, due to handling; thermal fatigue failure, during service; and dimensional changes, particularly for optoelectronic devices. The microstructure of the solder has an impact on each of the three failure modes after formation of the soldered bond. Changes in microstructure of a particular soldered bond may occur because of the composition of the solder, the chemical nature of the substrate and the manufacturing process used to form the solder joint (see Proceedings of Symposium for Process Design & Reliability of Solders & Solder Interconnections, Feb. 10–13, 1997, pages 49–58). Such changes may result in creep within a soldered joint connecting an optical fiber to an optoelectronic device.

Problems may occur with alignment and coupling efficiency to and from an optical fiber when there is movement due to creep in a joint used to lock an optical fiber inside an optoelectronic package. For this reason a need may exist for periodic adjustment of alignment between optical fibers and optically active devices. Realignment of optical fibers has been investigated in a variety of ways using soldered joints to hold optical fibers in required alignment with optical devices. United States Patent U.S. Pat. No. 4,119,363 describes hermetic sealing of an optical fiber inside a metal tube using solder. The solder, upon solidifying and cooling squeezes against the fiber and forms a hermetic seal. After passing the tube-fiber assembly through a hole in the wall of a device package and aligning the fiber with the device, a solder bond holds the tube to the wall to maintain optimum alignment within the device package.

United States Patents, U.S. Pat. No. 5,692,086 and U.S. Pat. No. 6,164,837 use commercially available gold sleeved optical fibers to be held in alignment with optical devices inside optoelectronic packages.

Optical fibers held in place by soldered joints may be realigned by solder reflow to soften the solder thereby allowing the optical fiber to be repositioned. In some cases, the reflow process introduces microstructural changes leading to embrittlement and eventually failure of the joint.

Soldered connections, in the form of optical fiber splices, terminations and hermetic seals, may include a thin metallic layer over the surface of an optical fiber adjacent to the position at which the splice, termination or seal will be made. Metal coating of terminal ends of optical fibers facilitates solder bonding and attachment of one optical fiber to another optical fiber, to a laser diode, to a ferrule and to connection points of optoelectronic devices.

United States Patent, U.S. Pat. No. 4,033,668 describes a method for joining a first glass member, such as an optical fiber, to a second member by means of solderable splices and terminations, which additionally can form hermetic seals. The splice, termination or seal may be formed after coating the peripheral surface of the glass member with a thin adhering metallic layer. After properly positioning the coated glass member, formation of a splice termination or seal with a corresponding member, may use heated solder to flow around the joint to form a bond between the members when cooled. When the second member is also formed of glass, a thin adhering metallic layer, similarly formed on the peripheral surface thereof, provides a solder receptive surface in the area of the intended joint. Metal may be applied to terminal portions of e.g. optical fibers by dipping them into a paste containing conductive metal particles.

United States Patent U.S. Pat. No. 5,100,507 addresses finishing techniques for lensed optical fibers. The process of finishing an optical fiber places an integral lens and a metallized outer coating on the end of an optical fiber. Metal may be deposited on the ends of optical fibers using known sputtering techniques. Materials deposited in this way include titanium, platinum and gold. Application of metal close to the lensed end of an optical fiber allows the formation of a soldered connection very close to the tip of the fiber. This limits subsequent movement of a lensed fiber relative to an aligned optical device.

Prior description of soldered connections involves individual processing of metallized ends of optical fibers. Optical fiber handling represents a challenge for the optical fiber industry. Manufacturing operations may include a number of steps requiring handling of long and short lengths of optical fiber. These lengths of optical fiber are fragile filaments requiring Careful handling and more efficient processes to accelerate the production of optical fibers, for communication links and related devices. With a growing demand for optical fiber systems and devices, there is a need for processing a plurality of optical fibers simultaneously.

SUMMARY OF THE INVENTION

The present invention provides a galvanic cell designed for precision application of metal to an array of nonconductors previously processed, by known electroless metal plating techniques, to produce a conductive layer on at least a portion of the nonconductor. The electrolytic plating equipment and process permit simultaneous electrolytic plating of a plurality of optical fiber tails, taking advantage of the conductive electroless metal fiber coatings as the cathodes of the electroplating cell. During operation of the electrolytic plating cell, pure metal such as nickel may be applied to increase the thickness of a previously deposited electroless metal layer thereby adding metal to e.g. an optical fiber that may subsequently be hermetically sealed in an optoelectronic package. Experimental refinement optionally accompanied by numerical modeling identified optimum design characteristics for the plating cell that includes a metal filament or bus bar, planar anodes, and a clamp fixture that stabilizes an array of optical fibers during plating. The resultant plating cell provides uniform deposition of metal down the axial length of each optical fiber.

In various optoelectronic packaging applications, where a hermetically sealed, soldered optical fiber feedthrough is required, there can be a need for the metallized fiber to survive multiple reflows of the solder to allow realignment of an optical fiber tip to an optoelectronic device. A common approach is to use gold/tin eutectic solder, which has a melting point of 280° C. The metallized fiber may frequently be heated higher than this temperature. Conventional electroless nickel/immersion gold plating becomes embrittled near 300° C. due to a phase transformation associated with presence of phosphorus in the electroless nickel deposit. The phase transformation causes the deposit to lose ductility. This leads to the initiation of cracking and failure of hermetically sealed, soldered joints that may impair the performance of a packaged optoelectronic device. Such device impairment may be overcome if the metallized fiber tip contains a minimum amount of electroless nickel. This is possible if the major constituent of the metal deposit, on the metallized optical fiber tip, is pure electroplated nickel. Pure nickel does not undergo the same phase transformation as electroless nickel.

An improved solder joint results from the use of electroless nickel as a very thin conductive layer over a stripped optical fiber. The conductive electroless metal deposit may be used as a cathode in an electroplating cell that adds a selected metal, e.g. pure nickel, over the electroless nickel. The presence of even small amounts of phosphorus, due to the use of electroless nickel, introduces the possibility of solder joint failure, as indicated previously. Further advantage could be gained by eliminating electroless nickel from metal coatings over nonconductors, such as optical fibers. This is possible using electroless silver as the conductive base layer. As such, the metal deposit survives repeated solder reflow cycles without substantial evidence of embrittlement. Preferably the use of silver provides a high yield of metallized optical fiber tips protected from embrittlement, as described herein. Other conductive base layers that are ductile and free from phase transformation may also be useful in applications consistent with the scope of the present invention More particularly, the present invention provides an assembly for electroplating nonconductors having conducting portions. The assembly is an electrode assembly comprising an insulating frame having a first projection opposite a second projection. Preferably the insulating frame comprises a resin selected from the group consisting of acrylic resins, polyvinyl chloride resins and polycarbonate resins. A metal filament, for connection to the negative pole of a source of electrical energy, extends from the first projection to the second projection. Adjacent to the metal filament, a first conductive plate is attached to the insulating frame at a first distance from the metal filament. A second conductive plate attaches to the insulating frame at a second distance from the metal filament. The first plate and the second plate are adapted for connection to the positive pole of a source of electrical energy. The nonconductor is at least one optical fiber having a conducting portion in contact with the metal filament to provide connection of the conducting portion to a negative pole of the source of electrical energy. In one embodiment of an assembly according to the present invention, there is an array of a plurality of optical fibers each having a conducting portion in contact with the metal filament.

An assembly according to the present invention provides a conductive composite coating on the surface of a nonconductor. The composite coating comprises a first or base layer of a ductile metal in contact with the surface of the nonconductor. A second layer of metal is electroplated in contact with the base layer, and an outer metal layer overlies the second layer. The composite coating has durability sufficient to first form a soldered connection of the outer metal layer to a substrate and thereafter to survive at least 15 reflow cycles of solder of the soldered connection between a molten and a solid condition without formation of cracks or gaps in the composite coating. The composite coating has a base layer of an electroless metal, preferably electroless nickel or silver, a second layer of electroplated nickel and an outer metal layer of immersion gold. Preferably the nonconductor is an optical fiber.

The present invention also includes a method for forming a metallized portion on the surface of an optical fiber comprising a series of steps, beginning with providing an optical fiber having a glass portion free from protective buffer. Known processes are used for sensitizing the glass portion for electroless plating of metal thereon. A conducting portion of optical fiber results from electroless plating a first or base layer of a ductile metal in contact with the glass portion of the optical fiber. After connecting the conducting portion to the cathode of an electroplating cell, an electroplated second metal layer is plated in contact with the first layer to provide an electroplated portion of the optical fiber. Application of an outer metal layer overlying the second metal layer forms the metallized portion having durability sufficient for formation of a soldered connection of the outer metal layer to a substrate and thereafter to survive at least 15 reflow cycles of solder of the soldered connection between a molten and a solid condition without formation of cracks or bare spots in the metallized portion.

Definitions An "assembly" according to the present invention may also be referred to herein as an "electrode assembly" or a "plating fixture" that comprises an insulating frame accommodating a pair of conductive plates, as anodes, and a metal filament connected to the negative pole of a suitable source of electrical energy. The "assembly" may include suitable wiring schemes for connection to a DC power supply.

The term "metal filament" or "bus bar" refers to an electrically conductive component of an assembly for connection to the negative pole of a source of electrical energy, such as a power supply, to serve as a contact to other conductive structures that may be included in a cathode structure. Conductive structures include metallized nonconductors including optical fibers having metallized portions, particularly metallized optical fiber tips.

A "composite coating" as used herein refers to at least two separate layers of metal applied successively over a nonconductor, such as an optical fiber. As applied to an optical fiber, a composite coating includes concentric layers of metal that may be applied using a common deposition technique or a combination of deposition techniques.

The term "optical fiber core" as used herein refers to the glass structure exposed by removal of buffer coating from a coated optical fiber.

Use of the terms "overlies" or "overlying," when used to describe relationships among metal layers of a composite coating, means that a selected layer, e.g. an outer metal layer, has been formed over an underlying layer and may or may not be in contact with the underlying layer due to the possibility of intervening layers.

The term "electroless metal" refers to a layer of metal applied using known electroless plating techniques.

Use of the terms "electroplated metal" or "electrolytic metal" herein refers to metal layers applied using electroplating methods including that described herein using an assembly according to the present invention.

The term "loading" refers to physical stress, in the form of tensile and compression forces and the like that may be applied to an optical fiber, particularly the metallized end of an optical fiber. Optical fiber loading produces defects such as cracks or gaps in a composite coating of metal layers formed over the end or tip of an optical fiber.

The term "clamp" means a gripping device used to hold one or more nonconductors, especially optical fibers, in a prescribed location and orientation within an assembly according to the present invention. A clamp may include gripping faces having a covering of frictional, resilient material, to assist with fiber retention, or the gripping faces may include surface structure, such as grooves, or channels, to facilitate or maintain alignment of an array of optical fibers. After forming an organized array of optical fibers, a clamp may be used to maintain relative positioning between fibers.

A "segmented anode" is a multi-piece anode having at least two parts that, while electrically isolated from each other, may be connected to the same positive pole of a source of electrical energy.

The term "adapted for connection" means that the cited elements, parts or structures include connectors, usually of a conventional type for connection to other parts or structures. In this case suitable adaptation allows connection to an electrical energy source, such as a battery or power supply.

BRIEF DESCRIPTION OF THE DRAWINGS

Notwithstanding any other forms, which may fall within the scope or the present invention, preferred forms of the invention will now be described, by way of example only, with reference to the accompanying drawings in which.

DETAILED DESCRIPTION OF THE PREFERRED EMBODIMENT

The invention embodies a reproducible metal plating process for selective metallization of nonconducting substrates including filaments, preferably in the form of optical fibers. Metallized optical fibers according to the present invention exhibit less failure during repeated solder reflow related to alignment of an optical fiber with an optoelectronic device. As required, detailed embodiments of the present invention are disclosed herein, however, it is to be understood that the disclosed embodiments are merely exemplary of the invention that may be embodied in various and alternative forms. The figures are not necessarily to scale, some features may be exaggerated or minimized to show details of particular components. Specific structural and functional details disclosed herein are not to be interpreted as limiting, but merely as a basis for the claims and as a representative basis for teaching one skilled in the art to variously employ the present invention.

Figures 1, 2, 3:
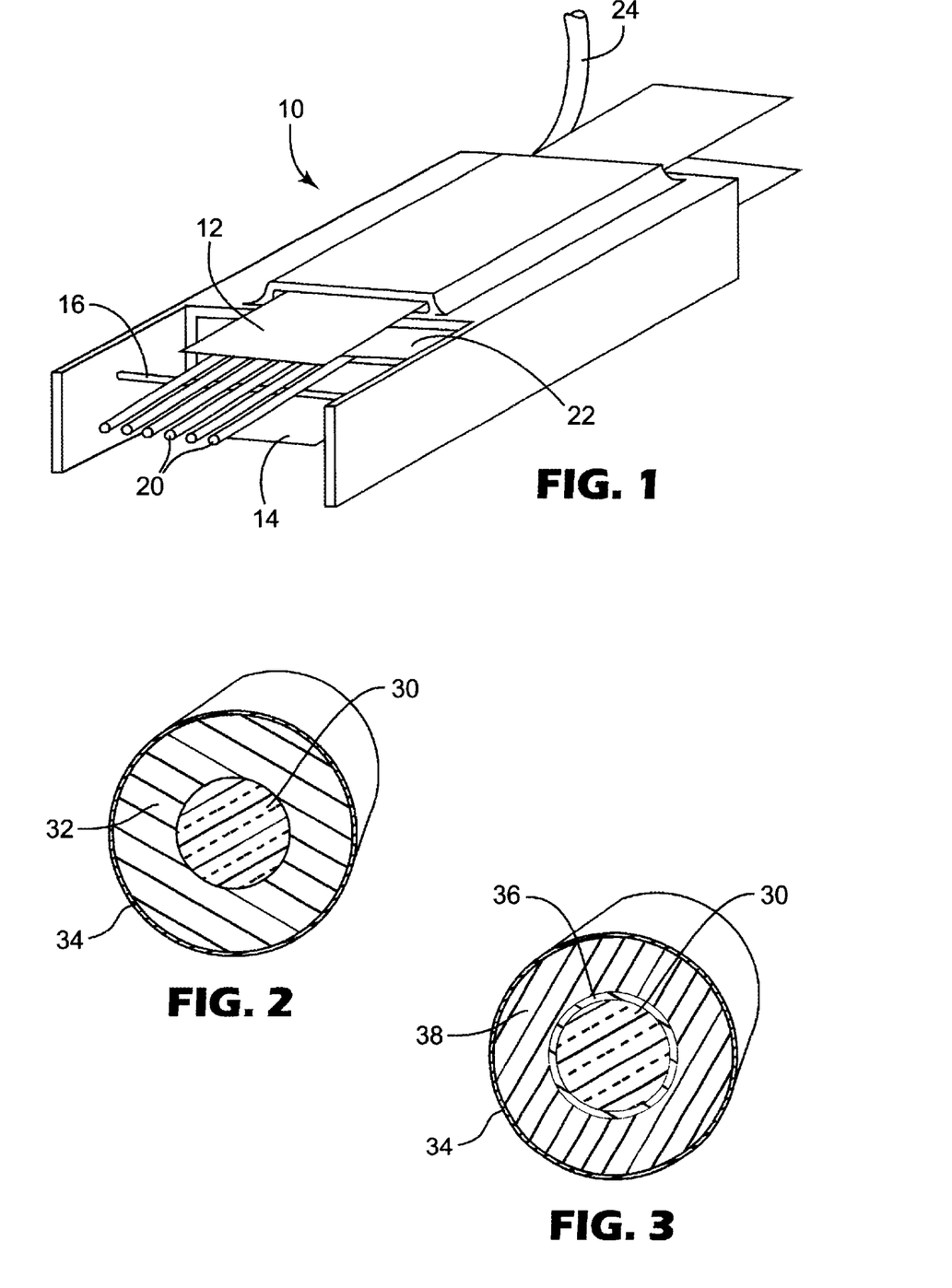
FIG. 1 is a perspective view of an electrode assembly according to the present invention, also referred to herein as a plating fixture.
FIG. 2 shows a perspective cross section of a metallized nonconductor such as an optical fiber surrounded by a two-layer composite metal structure.
FIG. 3 provides a perspective cross section of a metallized nonconductor such as an optical fiber surrounded by a three-layer composite metal structure.

Referring now to the figures wherein like numbers refer to like parts throughout the several views, FIG. 1 is a perspective view of an electrode assembly 10 also referred to herein as a plating fixture comprising at least a first anode 12 and a second anode 14, a bus bar 16 and a clamping retainer for a plurality optical fibers 20 held in a random or structured relationship. Before installation in the plating fixture 10, the end or tail of each optical fiber 20 receives a layer of metal sufficient to form a conductive band portion for connection to a power supply through a bus bar 16. In contact with the negatively charged bus bar 16, the metal-coated optical fibers 20 become part of the cathode structure of the electrode assembly 10. Completion of electrical connections for a plating fixture 10 requires connection of the first anode 12 and the second anode 14 to the positive terminal of the power supply using suitable connecting cords 24. After completing the electrical connections the electrode assembly may be mounted to immerse the electrodes 12, 14, 16 in a suitable electrolyte (see FIG. 4) for electrolytic plating of the metallized ends of the optical fibers that form part of the cathode.

Preferably, plating fixtures 10 according to the present invention have design elements, such as clamps 22 or clips or the like, to stabilize the optical fibers 20, and spatially orient them with respect to the dimensionally stable anodes 12, 14. Optimum positioning between optical fibers 20 and first 12 and second 14 anodes during electroplating promotes uniform deposition of metal down the axial length of each optical fiber 20. The dimensions of plating fixtures 10 according to the present invention may be varied according to the length of a metallized portion required at the end of an optical fiber 20.

Comparison of FIG. 2 with FIG. 3 shows differences of cross section of a single optical fiber core 30 metallized in typical fashion by electroless plating alone versus a metallized fiber according to the present invention, having a thin electrically conductive electroless metal layer over-plated with a thicker layer of electroplated metal. FIG. 2 provides a cross-sectional representation of a metallized optical fiber showing an optical fiber core 30 having a diameter of about 125 microns. Around the optical fiber core 30 there is an electroless metal deposit 32, preferably electroless nickel, about 2 microns thick. The metallized optical fiber structure further includes an outer layer 34 of immersion gold approximately 0.3 microns thick as a barrier to oxidation.

FIG. 3 is a similar cross sectional view to that of FIG. 2 except in the structure and thickness of metal deposits. In this case a hybrid process combines electroless plating with electrolytic plating to provide an improved metallized optical fiber structure. This structure includes a thin layer 36 of electroless metal of nickel or silver about 0.25 microns thick deposited around the core 30 of an optical fiber. The thin layer 36 of electroless metal is sufficiently conductive to function as a cathode to facilitate electroplating of a thicker metal layer 38 preferably of nickel about 2 microns to about 3 microns thick over the thin layer 36 of electroless metal. As before the metal structure includes a layer 34 of immersion gold approximately 0.3 microns thick to provide a barrier to oxidation.

Figure 4:
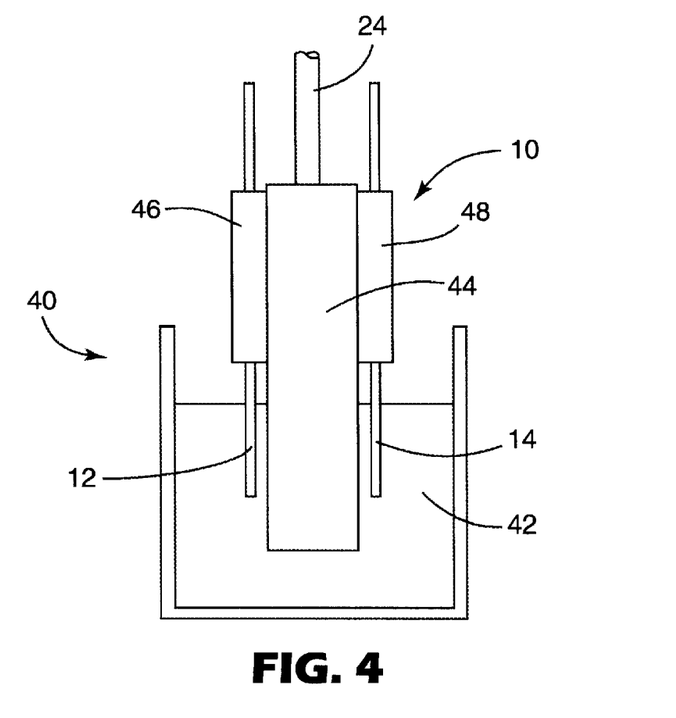
FIG. 4 is a side view of an electrolytic cell including an electrode assembly or plating fixture according to the present invention partially immersed in an electrolyte.

FIG. 4 is a side view of an electrolytic cell 40 including an electrode assembly 10 or plating fixture according to the present invention partially immersed in an electrolyte 42. The electrode assembly 10 includes a shell 44 including a first side slot 46 and a second side slot 48 as retainers of the first anode 12 and second anode 14 respectively. Electrical connections to the anodes 12, 14 and bus bar 16 cathode (not shown) may be made internally by way of an electrical cord 24 carrying wires from the positive and negative terminals of a power supply. As indicated previously, the bus bar 16 contacts the metallized tips of optical fibers 20 including them as part of the cathode of the electrolytic cell 40. During operation of the cell 40, electrolytic metal deposits on any portion of a metallized optical fiber 20 beneath the surface of the electrolyte 42.

Figure 5:
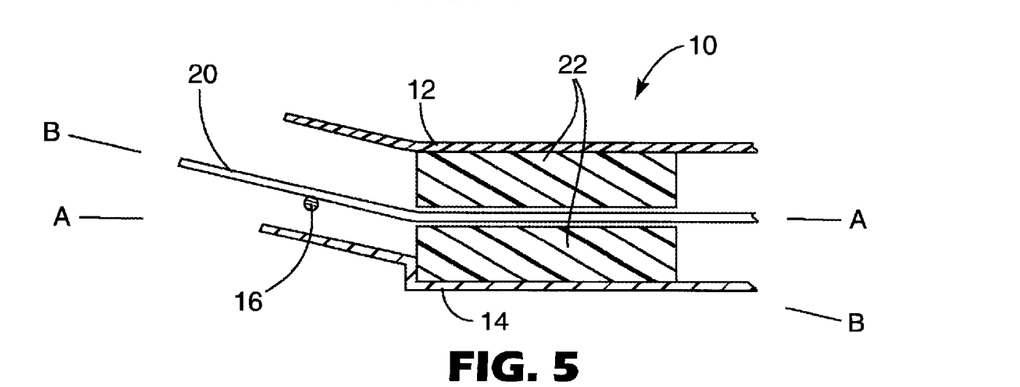
FIG. 5 is a schematic cross section taken from the side of an optical fiber plating fixture showing tips of optical fibers deflected to an axis B—B from the original fiber axis identified as A—A. The figure is not drawn to scale.

FIG. 5 provides a cross sectional diagram of a plating fixture 10 according to the present invention showing a bus bar 16 displaced from the central axis A—A, determined by common axial relationship of the fiber clamp 22 with the optical fibers 20. Displacement of the optical fibers 20 due to the positioning of the bus bar 16 places a positive lateral load on the metallized ends of optical fibers 20 to insure electrical contact between the metallized optical fiber surfaces and the bus bar 16. Axis B—B indicates the angular displacement of optical fibers 20, preferably about 10°, to provide sufficient bias to ensure electrical contact between the optical fibers 20 and the bus bar 16. The bus bar 16 may be made from any number of metals, with preferred selection of copper or stainless steel based upon the need for sufficient electrical conductivity, and resistance to chemical attack by components of certain electroplating bath compositions.

The electrode assembly or plating fixture shown in FIG. 5 includes a clamp 22. Suitable materials for the clamp include nonconducting resins selected from acrylic, polyvinyl chloride and polycarbonate resins, or other suitable insulating materials. In one preferred embodiment the clamp 22 includes coupling means for positioning a pair of dimensionally stable anodes 12, 14 at the outer surfaces of the clamp 22. The clamped, metallized optical fibers 20, held inside the clamp 22, adopt a parallel axial relationship with the dimensionally stable anodes 12, 14 on either side of the optical fibers 20 and bus bar 16 that provides electrical connection to a source of direct current. Dimensionally stable anodes 12, 14 according to the present invention comprise substantially planar sections, which may include orifices preferably in the form of planar metal screens of platinized niobium mesh. Optimal uniformity of electroplated metal over a thin deposit of electroless metal requires the use of dimensionally stable anodes 12, 14 that maintain a substantially invariant geometry for the duration of the electroplating process. Any change in anode geometry during electroplating affects the potential field distribution around the metallized surface. This in turn has an effect upon the distribution and shape of the metal layers produced by electroplating.

The design of plating fixtures 10 according to the present invention requires selection of anode pairs 12, 14 and bus bar connecting structures taking into consideration the number and geometry of an array of optical fibers 20 held by a plating fixture 10 during electroplating. Applied plating current density affects the rate of metal deposition and the shape of metal plating around the optical fiber ends. Experimental refinement and numerical modeling techniques, based upon fixture 10 design and applied electrical current characteristics, may be used to provide metallized optical fiber ends conforming to a prescribed metal thickness and shape.

The design criteria for anode 12, 14 and bus bar 16 configurations were derived as a function of metal deposit thickness and uniformity. Electrochemical modeling yielded two anode configurations shown to produce concentric and relatively uniform current density distribution along the longitudinal axis of each optical fiber, as well as across an array of optical fibers. Optional anode configurations include single-piece, asymmetric anode and multi-piece asymmetric anode structures, also referred to herein as segmented anodes. Application of metal appears to be equally effective using either a single-piece or multi-piece asymmetric anode, provided the length of metal coverage of an optical fiber end does not exceed 17 mm. For lengths exceeding 17 mm, a segmented anode structure is preferred to control metal deposit uniformity over a desired length, at the end of an optical fiber. Reference to asymmetric anode structures reflects the need for a difference in the distance of separation of one anode 12 from the optical fibers 20, lying along axis B—B (see FIG. 4), and the distance of separation of the opposing, second anode 14 from the optical fibers 20. This asymmetric configuration of anodes 12, 14, relative to the metallized optical fibers 20, offsets the tendency for uneven plating due to unsymmetrical current density distribution produced by the bus bar-to-fiber contact method of cathode formation.

The assembly, referred to herein as a plating fixture, may be used with a hybrid metal plating process that includes known techniques for applying metal coatings to nonconducting substrates using electroless metal plating and electrolytic metal plating in sequence. When applying metallic layers to optical fibers, as the nonconducting substrates, use of the hybrid metal plating process produces metal coated fibers exhibiting improved hermetic sealing compared to optical fibers metallized by electroless plating alone. Improved hermetic sealing performance was revealed during repeated solder reflow for repositioning optical fibers to maintain alignment between a fiber tip and an optoelectronic device. Reflow performance was determined by recording the number of reflow cycles preceding loss of hermetic sealing capability of a solder joint.

A metal plating process according to the present invention applies metal to at least a portion of an optical fiber through use of a combination of electroless plating and electrolytic plating techniques. Preferably the plating process applies metal at the ends of optical fibers for subsequent hermetic sealing. Application of metal to prescribed sections of optical fibers requires sequential use of electroless plating and electrolytic plating. The electroless plating process places an electrically conductive layer of e.g. nickel-phosphorus (Ni—P) alloy or silver on the surface of a glass optical fiber using well-known process steps for activating and catalyzing glass surfaces preceding electroless deposition of metal. Formation of a conductive deposit, by electroless metal plating, facilitates the use of electrolytic plating as a relatively rapid method for adding subsequent layers of pure metal or metal alloys. The identity of a particular metal or metal alloy will depend upon the composition of the electroplating bath. Electrolytic plating may, in some cases, involve the use of several plating bath compositions to produce concentric bands of different metals surrounding a nonconducting substrate.

A hybrid metal plating process provides inherent advantages related to the manufacture of metallized optical fibers. Observed improvements, over electroless metallizing processes, include an increased rate of metal deposition and better control of the shape or profile of a metal coating around a section of optical fiber, as previously discussed with regard to current density.

Metal deposition rates, using electroless plating, depend upon reaction steps including ion migration, ion diffusion and ion adsorption. Other factors affecting metal deposition rate include the concentration of ionic species, the temperature of plating and the stability of an electroless plating solution. FIG. 2 shows in cross section the result of coating an optical fiber with electroless metal, e.g. electroless nickel, as the main metal component.

The hybrid metal plating process operates at increased metal deposition rates, relative to electroless plating rates, with control over the shape of a metal deposit due to local current densities. Local current densities operate according to Tafel and diffusion limited electrochemical parameters associated with applied overpotential, in electrolytic plating. A power supply controls the overpotential during electrolytic plating to better regulate metal deposition rates when compared to electroless plating, assuming consistent plating bath performance. As a result, hybrid metal plating according to the present invention uses less time than electroless plating to produce a given thickness of metal over a section of optical fiber.

A hybrid metal plating process allows deposition of coatings of pure metals, as well as metal alloys on surfaces of nonconductors, e.g. optical fibers. Any metal may be applied to an optical fiber depending on the availability of appropriate electroplating chemistry and plating conditions. A preferred metal-coated optical fiber includes a thin layer of electroless nickel or silver about 0.2 micron to about 0.5 micron thick. The use of such a thin layer avoids problems of time-dependent metal failure associated with thicker layers of electroless nickel. Deposits of electroless nickel contain non-equilibrium phases of nickel and phosphorus (Ni—P) including a crystalline solid solution of phosphorus in nickel and an amorphous solid of nickel and phosphorus. Thermal cycling encountered during reflow of soldered, Ni—P metallized optical fibers causes a phase transformation accompanied by the precipitation of nickel phosphide ($Ni_3P$) at sites within the electroless nickel layer. Nickel phosphide initiates crack nucleation and premature failure of the coating during loading. Fiber loading relates to the application of stress to the an optical fiber including the metallized portion at the end of an optical fiber. Forces acting on a fiber include tensile and compressive forces. Such forces also affect metallized coatings over a fiber and lead to crack nucleation and fracture that may cause gaps in the coatings. Metallized layers containing brittle material, such as nickel phosphide, have lower fracture toughness than more ductile materials, e.g. pure nickel.

As mentioned above the success of the hybrid plating process relies upon application of a thin conductive seed layer of electroless metal to a nonconductor. An electroless nickel or silver layer about 0.2 micron to about 0.5 micron provides sufficient metal thickness to maintain contiguous electrical contact. Electrolytic deposition of pure metal, about 1 micron to about 3 microns thick, over the electroless nickel layer produces a composite metal coating wherein electroless nickel represents approximately 5% to 10% of the total metal deposit on the optical fiber. The relative percentage of electroless nickel varies towards a lower and lower concentration as the thickness of the electroplated metal layer increases. Reduction in the amount of the electroless nickel deposit translates into fewer crack-propagating sites. The probability of crack formation is further reduced because the overlying layer of electrolytic nickel is more ductile and resistant to fracture than electroless nickel. A hybrid metal plating process produces a more durable metal layer on the surface of nonconducting substrates, particularly, in this case, optical fibers.

Further improvement in the properties of metallized optical fibers may be achieved using the previously described plating fixtures and hybrid metal plating to vary the thickness and chemical composition of layered metal composites formed over the surface of nonconductors such as optical fibers. Layered metal composites show improved performance in solder reflow testing related to hermetic seals included in optoelectronic packages.

Figure 6:
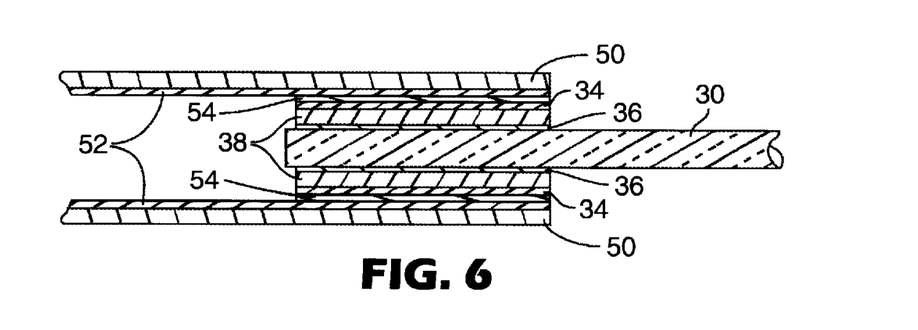
FIG. 6 shows a cross sectional structure typical of a hermetic seal formed between the metallized tip of an optical fiber and the metallized inner surface of a ferrule of the type used for interconnecting optical fibers with optoelectronic devices.

FIG. 6 shows a structure in cross section that is typical of a hermetic seal formed between the metallized tip of an optical fiber and the conducting inner surface of a ferrule of the type used for interconnecting optical fibers with optoelectronic devices. The connection includes an optical fiber core 30 having a thin layer 36 of an electroless metal, preferably nickel or silver, next to the surface of the optical fiber core 30. A second thicker metal layer 38, preferably of nickel, provides a ductile layer over the thin layer 36 of electroless metal. Immersion gold provides the outer layer 34 of a composite metal structure around the optical fiber core 30. A KOVAR™ ferrule 50 has a surface layer 52 of immersion gold over its inner surface. Formation of a hermetic seal, to hold a metallized A optical fiber tip inside a ferrule requires the use of a bonding agent, such as solder 54, particularly a gold/tin eutectic solder, that bonds readily to the gold of the surface layer 52 of the ferrule and the outer layer 34 of the metallized fiber core 30.

As discussed previously, one embodiment of a metallized optical fiber according to the present invention uses a thin, conductive layer of electroless nickel as the conductive base layer for subsequent electrolytic plating. The combined deposits of electroless nickel over-plated with electrolytic nickel gives improved solder-reflow performance when compared to deposits constituted of only electroless nickel. It was further discovered that replacing the electroless nickel layer with a layer of electroless silver gave even better performance in the solder reflow test for metal coating composites comprising immersion gold, over electrolytic nickel, covering electroless silver, deposited on the surface of an optical fiber. The electroless silver replaces electroless nickel-phosphorus as the conductive base layer.

Experimental
Optical Fiber Metallization Using a Layer of Electroless Nickel

Coming 62.5/125 fibers were cleaved, and arranged in an array of 10 fibers, with a 2 mm fiber to fiber separation. The optical fibers were stripped of their acrylate coatings using concentrated acid solution containing about 95% sulfuric acid. The rate of optical fiber stripping varies with temperature and is preferably about 60 seconds at 150° C.

Once stripped, the bare portions of the fibers were treated with a solution of stannous chloride (e.g. 10 g stannous chloride in a liter of 0.4M hydrochloric acid) by immersion for about 3–6 minutes at ambient temperature. Adhesion of the stannous chloride to the surface of the optical fiber occurs without any physical abrasion of the fiber surface. Stannous chloride is available in crystalline form from Sigma-Aldrich Corporation of St. Louis, Mo. Use of the term sensitizer or sensitizing solution herein refers to the stannous chloride solution which, after application to an optical fiber and drying, provides a layer of stannous ions on the fiber surface. Optical fibers coated in this way may be referred to as sensitized fibers or as having sensitized portions. Solutions of stannous chloride according to the present invention remain active for several weeks without protection from the ambient environment as by storing under gaseous nitrogen. Regardless of previous reports, stannous chloride sensitization according to the present invention yields uniform metal plating of bare optical fibers.

Activation of the surface of a sensitized optical fiber occurs, after rinsing the fiber with de-ionized water, by immersion of the sensitized portion of the fiber in an activating solution containing 0.25 g of palladium chloride per liter of 0.03 M hydrochloric acid in de-ionized water. The surface of the optical fiber becomes activated for electroless metallization during reduction of palladium ions to elemental palladium by reaction of palladium chloride with stannous chloride deposited on a sensitized fiber or a sensitized portion of an optical fiber. At this stage, the surface of the activated portion of the fiber has a covering of catalytic sites of palladium. Conversion of a sensitized fiber to an activated fiber requires from about 3–6 minutes of immersion in the palladium chloride activation solution. Palladium chloride was a 99.9 percent palladium (II) chloride obtainable from Sigma-Aldrich Corporation of St. Louis, Mo.

As required, the activated surface of an optical fiber may be deactivated, after rinsing with de-ionized water, by dipping the fiber in a second stannous chloride bath. Stannous chloride deactivator solutions of various concentrations have been found effective, including the same composition as the stannous chloride sensitizing solution. The deactivation step according to the present invention facilitates selective masking of a portion of an activated fiber whereby subsequent electroless metal deposition takes place only over areas of the fiber surface that remain activated after treatment with tin(II) solution. Use of tin(II) deactivation produces a masked fiber by dipping an activated optical fiber in a solution of acidified stannous chloride for about 1–60 seconds, preferably about 15 seconds. Metallized optical fiber tips according to the present invention were processed up to and including the tin(II) masking treatment as described above.

The catalyzed and masked optical fibers were then immersed in Nimuden SX electroless nickel plating bath (available from Uyemura International Corp., Ontario, Canada) for 2 minutes at 88° C., to provide a metallized fiber having a Ni—P layer of about 15 mm to 20 mm long, and approximately 0.44 micron thick, formed at a constant deposition rate of 0.22 micron of Ni—P per minute The plated fibers were removed from the plating bath, and rinsed in deionized water for 1 minute and allowed to air dry.

Nickel Electroplating Conditions

Electroless nickel-plated fibers, prepared as described above, were formed into an array of fibers having a separation of 2 mm between fibers, in a plating fixture according to the present invention. The plating fixture included the fiber holder, bus bar, anode assembly as shown in FIG. 4. The bus bar was positioned such that electrical contact with the metallized optical fiber was made at a selected distance from the stripped acrylate/optical fiber interface, depending on the amount of space required between the metallized end of an optical fiber and the buffer coat. In one embodiment, the point of electrical contact with the metallized end of the optical fiber was 1 mm from the buffer coating.

After organizing electroless plated optical fibers in a plating fixture, the fixture was positioned in a container of electrolyte with the electrodes submerged in the electrolyte. Connection of the anodes and the bus bar respectively to the positive and negative terminals of a variable power supply produced the electroplating cell used for electrolytic metal deposition. The connections may be made using a suitable wiring scheme including the use of individual wires or a convenient connecting cord carrying multiple wires. The cell contained an electrolyte identified as Technic nickel sulfamate FFP Inert Anode Electroplating Solution (available from Technic Inc., Irving, Tex.). A copper wire 0.25 mm in diameter was used for the metal filament or bus bar, and the anodes were formed from platinized niobium screens about 12.5 mm wide. Addition of metal by electroplating required an electrolyte temperature of 48° C. and a current density of about 27 mA/cm$^2$ (25 A/ft$^2$) for about 4.5 minutes to add a layer of nickel about 2.5 microns thick, as revealed by SEM analysis. Nickel was uniformly distributed around each optical fiber for the length immersed in the electrolyte. The thickness of the nickel deposit corresponds closely to the thickness of 3.0 microns ±0.2 micron predicted by theoretical calculation.

Optical Fiber Metallization Using a Layer of Electroless Silver

A number of Corning FLEXCORE 1060 fibers were metallized with electroless silver after stripping protective buffer from the optical fibers and sensitizing the bare fiber surfaces to promote deposition of the electroless silver. Removal of protective buffer involved immersion of optical fiber tips (17 mm in length) in 95–98% sulfuric acid at 150° C. for 60 seconds to remove acrylate coating. The stripped portion of the fibers was then rinsed in deionized water for 60 seconds. After dipping the fiber tips into 1N sodium hydroxide, containing 10 wt % sodium chloride, for 5 minutes at room temperature, the fiber tips were rinsed in deionized water for 60 seconds.

Surface sensitization of the stripped tips of the optical fibers required immersion for 4 minutes in a tin chloride solution containing 20 g tin(II) chloride in 40 ml 35–37% HCl per liter of solution. Upon completion of this treatment the fibers were rinsed in deionized water for 60 seconds. Known methods for polymer masking of a portion of the fiber tips may be carried out at this point in the process to limit subsequent metal deposition to only selected areas.

Application of electroless silver to sensitized optical fiber tips required immersion of the tips in a silver electroless plating solution produced by combining 25 parts (by volume) silver nitrate solution and one part (by volume) glucose reducer solution. A minimum volume of silvering bath is used to ensure complete coverage of stripped fiber ends, preferably arranged in an array of fibers.

Silver layers having desired properties were produced using silver and glucose solutions having the following compositions.

| Silver solution | |
|---|---|
| Deionized water | 500 mls |
| Potassium hydroxide pellets | 2.7 g (85 + % ACS reagent grade) |
| Ammonium Hydroxide | 13.2 ml (28–30% in water) |
| Silver Nitrate | 6.0 g |

The silver nitrate was slowly added, with stirring, until a brownish precipitate redissolved. Deionized water was added to increase the volume of the solution to one liter.

| Glucose solution | |
|---|---|
| Deionized water | 250 ml |
| d-Glucose | 125 g (ACS reagent grade) |

The mixture of d-glucose and water was stirred to cause the d-glucose to dissolve. The total volume of the solution was increased to 500 ml by addition of deionized water. All of the d-glucose was allowed to dissolve before the solution was used.

Tin sensitized fiber tips remained in the silvering solution for a period of two minutes to produce a layer of silver of 0.4–0.6 micron thick around the bare optical fiber without metal deposit on any masked section of fiber. The silvered fibers were removed from silvering solution and rinsed in deionized water for 60 seconds before electroplating, as described above, using a plating fixture according to the present invention. The electrolytic plating cell operated at a current density of about 110 mA/cm$^2$ (100 A/ft$^2$) to produce a nickel layer about 2 micron thick over the layer of electroless silver. Immersion gold was deposited to 0.3 micron over the nickel electroplated layer to protect it from oxidation. After rinsing the gold coated fibers in deionized water, any polymer mask may be removed by soaking treated fibers for a short time in a suitable solvent.

Solder Reflow Procedure and Results

Three types of metallized optical fibers were prepared by varying the metal composite structures as follows with reference to Examples 1–3. The resulting metallized fibers were evaluated using the solder reflow test. Typical test results are provided in Table 1.

Example 1

Conventional Electroless Nickel Over-plated with Immersion Gold

Preparation of optical fiber tips for Example 1 required conventional sensitization using tin and palladium solutions before applying electroless nickel during immersion in an electroless nickel plating bath at 89° C. for about 8 minutes to build an electroless nickel (Ni—P) layer 2 microns thick. After rinsing the nickel coated fibers, a layer of immersion gold was applied by dipping the fiber tips into an immersion gold solution for about 10 minutes at 80° C. to produce a layer of gold about 0.3 micron thick.

Example 2

Conventional Electroless Nickel Electroplated with Nickel

Metallized optical fibers of Example 2 were prepared using the hybrid metal plating process previously described. The electroless and electrolytic plating conditions produced thicknesses of 0.4 micron Ni—P and 2 microns electrolytic Ni respectively. As before, a solution identified as Technic High Speed Nickel (available from Technic Inc., Irving, Tex.) sulfamate was used as the electrolyte for nickel electroplating at 48° C. and a current density of about 55mA/cm$^2$(50 A/ft$^2$) 50 ASF. The electroplated nickel layer was over-plated with a layer of immersion gold 0.3 micron thick.

Example 3

Electroless Silver Electroplated with Nickel

Metallized optical fibers of Example 3 were prepared using the hybrid metal plating process previously described for Example 2. In this case, however, the electroless nickel layer nearest to the optical fiber surface was replaced with a layer of silver applied to tin sensitized fiber tips immersed in the silvering solution for a period of 2 minutes to produce a layer of silver of 0.4–0.6 micron thick around the bare optical fiber. The silvered fibers were removed from silvering solution and rinsed in deionized water for 60 seconds before electroplating, as described above, using a plating fixture according to the present invention.

Solder Reflow Test Procedure

Determination of solder reflow cycle performance of metallized optical fiber tips required the use of test components referred to herein as copper substrates. The copper substrates were 2 mm wide, 8 mm thick and 1 cm long. A solder ball was formed on the width of the copper substrate by heating a gold/tin eutectic solder wire, approximately 0.75 mm in diameter, and from about 1 mm to about 2 mm long, at a temperature of at least 100° C. using a heated forming gas (95% Argon, 5% hydrogen) and solder tweezers. The heat was applied to the substrate with the solder tweezers until the pre-placed solder wire section melted to form a solder ball bonded to the substrate.

The metallized end of an optical fiber was laid on the surface of the solidified solder ball and a downward biasing force was applied between the metallized fiber end and the solder ball. Heat was applied to cause reflow of the solder ball so that the fiber end dropped into the middle of the molten mass of solder to be surrounded with solder. A solder reflow cycle was completed by allowing the solder to re-solidify.

After the initial solder reflow cycle, the solder was cycled several times between a heated, molten state and a cool, solidified state. The heating stage of a reflow cycle was stopped immediately when the solder was visibly molten. Preferably the solder ball undergoes four reflow cycles with the metallized fiber in contact with solder. This represents five times that the solder has been melted including initial deposition on the copper substrate.

During the fifth reflow cycle, when the solder was visibly molten, the optical fiber was drawn out of the solder, in the direction of the fiber axis, a distance that was greater than 125 microns but no more than 250 microns. The resulting position of the displaced fiber was maintained to allow the solder to solidify. This allowed inspection of the metallized fiber end for cracks and gaps showing exposed glass. Heat was applied again to reflow the solder so that the metallized fiber could be returned to its original position.

Solder reflow cycling and metallized fiber end inspection were continued at five cycle intervals, i.e. 5, 10, 15, 20 etc. reflows, until visible damage was observed as bare glass or cracks in the metal layer. Metallized optical fiber reflow performance was reported as the number of reflow cycles completed before there was visible damage. A metallized fiber showing cracks or bare glass visible after five reflows would be rated as surviving 5 reflow cycles.

TABLE 1

Metallized Fiber Evaluation

Replicates to Record Reflow Cycles (Replicates)

| Sample Set | R1 | R2 | R3 | R4 | R5 | R6 | R7 |
|---|---|---|---|---|---|---|---|
| Example 1A | 5 | 5 | 10 | – | – | – | – |
| Example 1B | 5 | 5 | 5 | – | – | – | – |
| Example 2A | 20 | 15 | 15 | 20 | 20 | – | – |
| Example 2B | 20 | 30 | 20 | 30 | 15 | 5 | 10 |
| Example 3A | 25 | 25 | 25 | 35 | – | – | – |
| Example 3B | 25 | 20 | 25 | 25 | – | – | – |
| Example 3C | 25 | 55 | 55 | 45 | – | – | – |

Average number of reflow cycles for Example 1 = 5.83
Average number of reflow cycles for Example 2 = 18.33
Average number of reflow cycles for Example 3 = 32.08

NOTE:
Letter designations of specific examples, e.g. Example 1A and Example 1B, refer to separate runs to prepare examples via the same procedure.
Example 3C was plated at a slightly higher current density resulting in a thicker nickel deposit. The higher reflow values indicate that a higher current density and/or thicker nickel will result in improved solder flow performance.

As required, details of the present invention are disclosed herein; however, it is to be understood that the disclosed embodiments are merely exemplary. Therefore, specific structural and functional details disclosed herein are not to be interpreted as limiting, but merely as a basis for the claims and as a representative basis for teaching one skilled in the art to variously employ the present invention.

What is claimed is:

1. An assembly for at least partial immersion in an electrolyte, in a container, for electroplating a nonconductor having a conducting portion, said assembly comprising:
    an insulating frame having a first projection opposite a second projection;
    a metal filament for connection to a negative pole of a source of electrical energy, said metal filament extending from said first projection to said second projection;
    a first conductive plate attached to said frame at a first distance from said metal filament; and
    a second conductive plate attached to said frame at a second distance from said metal filament, said first plate and said second plate being adapted for connection to a positive pole of the source of electrical energy, said metal filament and portions of each of said first projection and said second projection of said insulating frame being located to submerge in said electrolyte for electroplating said nonconductor having a conducting portion.

2. The assembly of claim 1, wherein said nonconductor is at least one optical fiber having said conducting portion in contact with said metal filament to provide connection of said conducting portion to the negative pole of the source of electrical energy.

3. The assembly of claim 2, wherein said at least one optical fiber is a plurality of optical fibers each having said conducting portion in contact with said metal filament.

4. The assembly of claim 3, wherein said conducting portion of each of said plurality of optical fibers lies in a plane parallel to at least a portion of each of said first conductive plate and said second conductive plate.

5. The assembly of claim 4, wherein said first distance differs from said second distance.

6. The assembly of claim 5, wherein said first conductive plate and said second conductive plate include multiple orifices.

7. The assembly of claim 6, wherein said first plate and said second plate comprise a metal screen.

8. The assembly of claim 7, wherein said metal screen comprises a platinized niobium screen.

9. The assembly of claim 1, further including a wiring scheme to connect said metal filament to the negative pole of the source of electrical energy and said first plate and said second plate to the positive pole of the source of electrical energy.

10. The assembly of claim 1, wherein said insulating frame comprises a resin selected from the group consisting of acrylic resins, polyvinyl chloride resins and polycarbonate resins.

11. An assembly for at least partial immersion in an electrolyte, in a container, for electroplating nonconductors having conducting portions, said assembly comprising:
    an insulating frame including a shell having a first slot and a second slot, said insulating frame further including a first projection opposite a second projection;
    a metal filament for connection to a negative pole of a source of electrical energy, said metal filament extending from said first projection to said second projection of said insulating frame;
    a first conductive plate retained in said first slot of said shell at a first distance from said metal filament; and
    a second conductive plate retained in said second slot of said shell at a second distance from said metal filament, said first conductive plate and said second conductive plate being adapted for connection to a positive pole of the source of electrical energy, said metal filament and at least a portion of each of said first projection and said second projection of said insulating frame being located to submerge in said electrolyte for electroplating said nonconductors having conducting portions.

12. An assembly for at least partial immersion in an electrolyte, in a container, for electroplating conducting portions of a plurality of nonconductors, said assembly comprising:
    an insulating frame including a tubular shell having openings at opposing ends thereof, said tubular shell including a first slot and a second slot said insulating frame further including a first projection opposite a second projection;
    a clamp attached to said insulating frame to hold said plurality of nonconductors within said tubular shell;
    a metal filament for connection to a negative pole of a source of electrical energy, said metal filament extending from said first projection to said second projection of said insulating frame;
    a first conductive plate retained in said first slot of said tubular shell at a first distance from said metal filament; and
    a second conductive plate retained in said second slot of said tubular shell at a second distance from said metal filament, said first conductive plate and said second conductive plate being adapted for connection to a positive pole of the source of electrical energy, said metal filament and portions of each of said first projection and said second projection of said insulating frame being located to submerge in said electrolyte for electroplating said conducting portions of said plurality of nonconductors held by said clamp.

* * * * *